US005448273A

United States Patent [19]

Klein et al.

[11] Patent Number: 5,448,273

[45] Date of Patent: Sep. 5, 1995

[54] THERMAL INK JET PRINTHEAD PROTECTIVE LAYERS

[75] Inventors: Igal E. Klein, Karmiel, Israel; Cathie J. Burke, Rochester, N.Y.; Roberto E. Proano, Rochester, N.Y.; Renato P. Apollonio, Rochester, N.Y.; Robert V. Lorenze, Webster, N.Y.; Daniel O. Roll, Pittsford, N.Y.

[73] Assignee: Xerox Corporation, Stamford, Conn.

[21] Appl. No.: 80,631

[22] Filed: Jun. 22, 1993

[51] Int. Cl.[6] .......... G01D 15/18
[52] U.S. Cl. .......... 347/64; 428/681
[58] Field of Search .......... 346/140 R; 347/65, 64; 428/681

[56] References Cited

U.S. PATENT DOCUMENTS

| | | | |
|---|---|---|---|
| 4,335,389 | 6/1982 | Shirato et al. | 346/140 R |
| 4,535,343 | 8/1985 | Wright et al. | 346/140 R |
| 4,596,994 | 6/1986 | Matsuda et al. | 346/140 R |
| 4,609,427 | 9/1986 | Inamoto et al. | 156/633 |
| 4,904,542 | 2/1990 | Mroczkowski | 428/610 |
| 4,951,063 | 8/1990 | Hawkins et al. | 346/1.1 |
| 4,965,611 | 10/1990 | Pan et al. | 346/1.1 |
| 5,081,473 | 1/1992 | Hawkins et al. | 357/59 |
| 5,142,308 | 8/1992 | Hasegawa et al. | 346/140 R |
| 5,148,191 | 9/1992 | Hasegawa et al. | 346/140 R |
| 5,352,907 | 10/1994 | Matsuda et al. | 257/39 |

FOREIGN PATENT DOCUMENTS 0346935 12/1989 European Pat. Off. .

OTHER PUBLICATIONS

Chang, L. S., "Mechanisms of Failure of Thermal Ink--Jet Thin-Film Heaters in Alkaline Solutions", *IBM SID Digest*, pp. 271, 273 (1988).

Clevenger, et al. "The Relationship Between Deposition Conditions, the Beta to Alpha Phase Transformation, and Stress Relaxation in Tantalum Thin Films", *J. Appl. Phys.*, 72, (10), pp. 4981-4924 (Nov. 1992).

Askeland, et al., "The Second-Generation Thermal InkJet Structure", *Hewkett-Packard Journal*, pp. 28-31 (1988).

Bunshah, R., "Mechanical Properties of Thin Films", *Vacuum*, vol. 27, No. 4, *Pergamon Press*, pp. 353-362 (1977).

Klein, I., "Residual Stress in Thin Films", Xerox Corporation, Webster Research Center, pp. 1-35 (1990).

*Primary Examiner*—Mark J. Reinhart
*Assistant Examiner*—Valerie Ann Lund
*Attorney, Agent, or Firm*—Oliff & Berridge

[57] ABSTRACT

In a thermal ink jet printhead with a protective layer, the protective layer is made of a thin film material having a melting point not less than about 1000° C. A deposition process for preparing the thin film material produces a thin film material having, at an operating temperature for the thermal ink jet printer, a thermal conductivity coefficient not less than about 10 W/m.K, a compressive yield strength not less than about 1400 MPa, and a compressive residual stress of not greater than about 1200 MPa. The protective layer is smooth, substantially free of pores and impervious to stress corrosion or hydrogen stress cracking at a hydrogen uptake rate of less than about 5 ppm. The protective layer may also contain an adhesion enhancing region between the protective layer and an underlying layer or an anodic region contiguous with an underlying thin film material of the protective layer. The adhesion enhancing region is a reaction product between an ambient gas and the thin film material of the protective layer and extends only to the grain boundaries of the protective layer. The contiguous anodic region is substantially free of pores, has a homogeneous composition, protects an underlying thin film material against corrosive species and hydrogen and is formed by anodization of the underlying thin film in an aqueous electrolytic process.

7 Claims, 2 Drawing Sheets

THERMAL INK JET PRINTHEAD PROTECTIVE LAYERS

BACKGROUND OF THE INVENTION

The invention pertains to improved thermal ink jet printheads, particularly protective layers used to extend printhead life.

BACKGROUND OF THE INVENTION

Thermal ink jet printers, although quite effective in commercial applications, experience printhead heater failure after extended high-volume use. Studies in thermal ink jet printing technology suggest mechanisms that contribute to heater failure in thermal ink jet printheads. During fast, high temperature cycling in a corrosive ink environment, a thermal ink jet printhead is exposed to severe and hostile chemical, thermal and mechanical conditions.

Thermal ink jets utilize pulse heating of thin film heaters to form a bubble in an ink medium over a heater surface in a localized region. The growth of the bubble is nearly instantaneous. By heating ink in contact with a heater surface to several hundred degrees celsius, a vapor bubble is generated which subsequently ejects an ink droplet from a nozzle orifice.

Although specific characteristics of different thermal ink jet printheads may vary, efficient performance of thermal ink jet printers requires that a printhead heater typically functions for 2 to 8 microseconds, raising the heater surface temperature, at very high frequency (1 Khz and above). Liquid ink may 1) be solvent or aqueous based, 2) contain a variety of ingredients in addition to dyes or pigments, such as surfactant polymers, etc., and 3) be either alkaline or acidic.

During operation of a thermal ink jet printhead, several mechanical, thermal or chemical influences adversely affect the performance and life of the device. Such influences may include cavitation-induced damage, causing eventual failure of the heater device. See Chang, "Mechanisms of Failure of Thermal Ink-Jet Thin-Film Heaters in Alkaline Solutions," IBM SID Digest (1988). Deleterious cavitation effects on internal printhead heater surfaces result from an instantaneous collapse of the bubble upon drop ejection through the nozzle or orifice, exerting a cavitational force on the heater.

This cavitational force results from bubbles on the heater surface collapsing instantaneously, nearly as fast as they are formed, by the cyclic pulse heating, and exerting an impulse pressure upon collapse. Shock waves following the collapse generate a high level of stress at the heater surface. The high frequency repeat cavitation stress on the printhead surface can rapidly erode the heater surface material, ultimately resulting in failure of the printhead heater mechanism.

In an attempt to reduce the negative effects due to cavitation and corrosive forces exerted during operation, thin corrosion and impact resistant films have been used to protect an underlying heater surface, thus extending, to a limited extent, the life of the printhead.

Another significant factor affecting the operational life of a thermal ink jet printhead is ink used in the printing process. Inks are inherently chemically corrosive. Unless protected, a thermal ink jet printhead will quickly fail from repeated use in the corrosive, thermal ink jet environment.

Chemical or electrochemical properties of thermal ink jet ink compositions, such as ionic strength, ion mobility and reactivity, should be minimized to reduce a deleterious affect on heater function, which eventually results in heater failure. Reactive ions can quickly etch a heater surface material when used in printing environments, making an underlying heater layer significantly more vulnerable to chemical or electrochemical attack. Reduction of corrosive chemical and electrochemical properties of ink is limited by conflicting requirements the ink must have to produce good print quality.

In an alternative approach to reducing susceptability of printheads to premature failure, skilled artisans have attempted to further improve the resistance of materials used in printhead components, by incorporating new, more resistant materials into more conventional printheads. Printhead redesign has also resulted in longer life printheads.

In an attempt to further reduce mechanical cavitation stresses on printheads due to forces exerted upon collapse of an ink bubble on the heater's surface, as discussed above, Chang discloses closed-pool and open-pool printhead designs.

Chang discloses a conventional thermal ink jet heater consisting of a silicon, aluminum or glass substrate having a thermal barrier layer of silicon dioxide, a thin film of resistive material, such a $Ta_2AI$ or $HfB_2$ (sputter-deposited and patterned,) and deposited and patterned conducting electrodes of AI or Au. The resistive and electrode conducting layers are then protected by two or more inorganic or metallic passivation layers (overcoats). The overcoat layer disclosed may be sputtered or Plasma-Enhanced-Chemical-Vapor-Deposited $SiO_2$, SiN:H, SiC:H, tantalum or zirconium. An additional polyamide coat may be applied over the electrodes, away from the active heater region.

The experimental printheads were tested at higher drive voltages to significantly shorten the required test period simulating long-term, high-volume printing and providing representative lifetime distribution characteristics of the experimental printheads. Based on experimental data collected, Chang concluded that a closed-pool design improves printhead life. The significance of a low internal stress protective layer is neither identified nor addressed as an alternative for extending printhead life. The resulting protective layers suffer from high internal stress, thus contributing to early failure of the printhead.

In another attempt, U.S. Pat. No. 4,335,389 to Shirato discloses a liquid droplet ejecting recording head. The recording head has a liquid ejecting portion, including an orifice for ejecting liquid droplets, and a heat actuating portion. A surface layer of the heat actuating portion is made of a material whose $\Delta W$ is not more than 0.1 mg/cm$^2$, where $\Delta W$ is a decrement weight of material per unit area in mg/cm$^2$ at a time "t", when subjected to a weight decreasing test. The heat actuating portion is positioned on a heat generating portion. The heat generating portion comprises a lower layer overlying a substrate, and an upper layer overlying the resistive heater layer on the lower layer. Electrodes are disposed on the surface of the resistive heater layer and generate heat conducted to ink on the surface. A surface layer as discussed above completes the disclosed device. The surface layers disclosed in Shirato may suffer from high internal stress due to the properties required of the surface layer and the process for preparing the layers.

Such stressed layers may offer limited benefit over conventional printhead protective layers in preventing premature printhead failure.

The layers discussed in Shirato do not necessarily possess a low internal stress in the protective layers disclosed. Shirato fails to identify or address a correlation or significance between the performance of the protective layer and inherent microstructure and internal stress level of the protective layer, controlled by methods for preparing the protective layers. The protective layers disclosed in Shirato either lack a sufficient compressive yield strength or possess high compressive residual stress to effectively extend printhead life beyond the life of conventional printheads.

In a preferred embodiment, Shirato discloses vapor deposition of a mixed tantalum oxide/tantalum metal intermediate layer deposited on a prepared substrate between a separate layer of tantalum oxide and tantalum. Each layer is a distinct layer. The tantalum layer is not in direct contact with the tantalum oxide layer but the tantalum layer and tantalum oxide layer sandwich the mixed intermediate layer. Based on the experimental results for this preferred embodiment, no advantages were observed for this "mixed" structure.

In yet another attempt, U.S. Pat. No. 4,596,994 to Matsuda discloses a liquid ink jet recording head. The liquid ink jet recording head has a substrate, a heat generating layer, a layer containing electrodes for generating heat, and a protective coating as a top layer. The disclosed protective coating has three structural layers. The third layer is in direct contact with the recording liquid, imparting protective coating reinforcement to prevent liquid penetration and provide liquid resistance and mechanical strength. Similar to surface layers of Shirato, the effectiveness of the disclosed protective third layer is limited by a resulting high internal stress of the third layers.

Matsuda is specifically concerned with improving the second layer of the protective layer. The second layer is stated to improve adhesion between the first and third layers. The effectiveness of the protective layer disclosed in Matsuda is limited to the adhesive strength of the three-layer structure and properties of conventional materials used. Matsuda does not identify that a life extending effectiveness of the protective layer corresponds to a lower internal stress level of a protective layer and corresponding lower internal stress levels between an underlying layer and the protective layer. The disclosed layers are separate, distinct layers and are limited by a requirement that an element of the second layer be common to an adjacent layer.

In a specific attempt to incorporate tantalum or tantalum containing materials, known to be resistive to corrosion, in a resistive layer for a thermal ink jet printhead, U.S. Pat. No. 4,535,343 to Wright discloses a thermal ink jet printhead with a self-passivating element. The self-passivating element comprises for example tantalum, tantalum nitride, niobium, vanadium, hafnium, titanium, zirconium, or yttrium. The disclosed resistive layer is chemically-inert, electrically insulated and thermally conductive because it is not deposited, but "grown" or formed by a reaction between the material of the ink jet structure to be protected and an element, which when reacted forms the resistive layer. The disclosed resistive layers are excellent thermal conductors, and resist chemical attack. However, Wright discloses resistive layers (in a specific design of the thermal ink jet transducer) and does not disclose that the layers are resistant to cavitation forces. In addition, the layer is subjected to a reactive oxide atmosphere to obtain the final desired characteristics. The resulting layers possess insufficient material strength and are porous, thus exhibiting low resistance to deleterious cavitation forces in high-volume commercial printing environments.

Published European Patent Application No. 0,346,935 to Hiroto discloses forming an anodized resistive layer by electrolyte treatment. Treating the applied film surface, unprotected by a cured layer of resin, converts the film surface to a layer having a higher resistance thereby forming an insulating material. A final step in the treatment process converts an exposed film surface to a heat-generating resistor. The anodized layers act as both insulator and resistor. There is no suggestion that the disclosed layers have characteristics preventing permeation of corrosive or embrittling elements through to an underlying layer.

U.S. Pat. No. 4,965,611 to Pan discloses yet a further attempt to improve a protective corrosion-resistant layer over a conductive layer. Pan discloses a thermal ink jet printhead having a substrate, an insulating layer, a resistive layer and two separate gold conductive regions formed over the resistive layer, the conductive layers covered by a corrosion-resistant amorphous metal alloy layer. A corrosion-resistant substance, characterized as a dense structure without grain and boundaries would be suitable for the amorphous metal alloy layer. The layers disclosed in Pan have an inherent residual stress component which limits the life of the device to those of conventional devices. Pan does not address the effects due to cavitation forces and provides no indication that an amorphous layer may have a sufficiently low internal stress level to achieve a superior protective layer to resist cavitation over an extended period.

SUMMARY OF THE INVENTION

Applicants have recently discovered that increased durability of protective materials depends on the microstructure and internal stress level of the material comprising the protective layer.

Serious studies of protective layers on the ink jet printhead indicate that protective films are under residual stresses, whether tensile or compressive, and conventional protective films possess inherently high residual stresses which limit a useful life of the layer, and thus result in premature failure of conventional devices. After investigation of this phenomenon, applicants have discovered that a protective layer that has an inherently low compressive or tensile residual stress significantly improves durability of the protective layer, thereby significantly increasing the useful life of ink jet printhead devices.

A thermal ink jet printhead according to the invention has a protective layer. The protective layer is a thin film material. The thin film material has a melting point not less than about 1,000° C. At an operating temperature of the thermal ink jet printer, a thermal conductivity coefficient of the thin film material is not less than about 10 W/m.K, a compressive yield strength of the thin film material is not less than about 1400 MPa and a compressive residual stress of the thin film material is not greater than about 1200 MPa. The inventive protective layer is smooth, substantially free of pores and impervious to stress corrosion or hydrogen stress cracking at an hydrogen absorption rate of about less than 5 parts per million.

In a preferred embodiment, a residual stress between an underlying layer and the thin film material of the invention is reduced by forming an adhesive region, between the thin film material and an underlying layer extending only into the grain boundaries of the thin film material. The inventive adhesive region preferably comprises a reaction product between a reactive gas and the thin film material.

In yet another preferred embodiment of the inventive printhead, a protective layer is an underlying thin film material and a contiguous anodic region. The anodic region is substantially free of pores, has a low residual stress, is a homogeneous composition, protecting the underlying thin film material against permeation of the corrosive species and hydrogen, and is formed by anodizing the underlying thin film in an aqueous electrolytic process. This protective layer is not a resistor layer.

DETAILED DESCRIPTION OF PREFERRED EMBODIMENTS

Figure 1A:
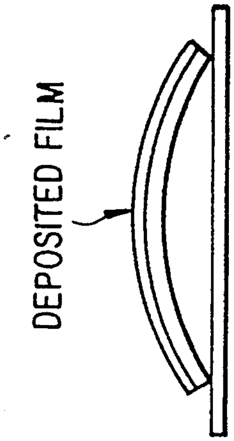
FIG. 1*a* is representative compressive stress in convex bending of a deposited thin film surface.
Figure 1B:
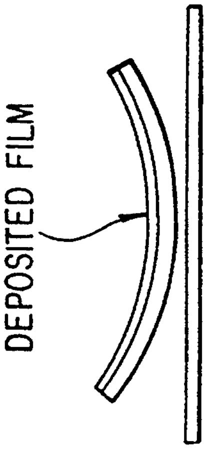
FIG. 1*b* is representative tensile stress in concave bending of a deposited film surface.

Applicants' investigations of protective layers in ink jet printhead devices suggests that residual stress components of thin film material protective layers may be significantly enhanced by reducing residual compressive or tensile stresses which exist in protective thin film materials applied to a substrate or underlying layer. A residual stress may be compressive (namely the film would like to expand parallel to the surface), or tensile (the film would like to contract). A film covering just one side of a substrate, exhibiting compressive stress would lead to a convex shape, while a film under tensile stress would lead to a concave shape, as represented in FIGS. 1*a* and 1*b*. In thermal ink jet printheads, mechanical residual stresses in thin films contribute to premature failure of the printhead device, namely metal cracking in delamination which substantially reduces the anti-cavitation properties of the protective layer and permits permeation of corrosive species from ink compositions. Such conventional printheads fail to withstand the high frequency, cavitational forces exerted on the surface of printhead devices. Thin film stresses affect interfacial properties like adhesion and consequently have an effect on durability and reliability.

Temperature can also have an important effect. In processes that involve thermal cycles, strains are introduced in the film because of the difference in thermal expansion coefficients between the film and an underlying substrate. The direction and magnitude of a residual stress depend on the nature of the film and the substrate, the deposition technique and deposition parameters, the temperature of the deposition and measured temperature. Residual stress may be expressed as a sum of two contributing factors. The first factor is intrinsic (or growth) stress observed in as-deposited films and can be a result of defects of structural mismatch between a film and the substrate. The second factor is thermal stress, introduced by temperature changes after deposition. Residual stress of a thin film depends on a number of mechanical and thermal properties of thin films such as melting temperature, ratio of a substrate temperature to a melting temperature, yield strength and a thermal expansion coefficient.

The two contributing factors to stress in a film may be expressed in the following relationship.

$\sigma=\sigma_{int}\sigma_{th}$, i.e. the sum of an intrinsic stress $\sigma_{int}$, and a thermal stress $\sigma th$.

An intrinsic stress is due to the constrained volume change taking place in the film following mechanical anchoring to the substrate and the simultaneous effect of energetic impinging particles. To reduce this strain generated in the film during growth, an atomic rearrangement is required which attempts to change the volume of the deposited film. Intrinsic stress expresses the accumulating effects of the crystallographic flaws that are built into the coating during deposition due to any mismatch of lattice structure. Since the density of frozen flaws in a film can be exceptionally high, large intrinsic stresses can develop. Their magnitude may be comparable to the yield strength of most bulk materials. Yield strength of thin films is almost always substantially larger than that for a bulk material, probably due to the bulk material's microstructure. Yield strength is related to the grain size of deposited thin films.

A further source of intrinsic stress is structural features which build into thin films, like grain boundaries, dislocations, vacancies and interstitial sites. Reaction to phases on the substrate-film interface causes a change in the stress profile. Deposition of particularly thin film materials may result in volume shrinkage which brings about a large tensile stress in the film.

In general, intrinsic stresses caused by impurities in the deposition atmosphere during evaporation cause the stress to be compressive, although intrinsic stresses in evaporated deposits are almost always tensile. Thin films grown by sputtering or subjected to ion bombardment (for example, ion implantation) very often exhibit compressive stress. Skilled artisans suggest that inherent tension which exist in thin film materials is attributable to disordered material shrinkage during growth followed by some type of void network (such as grain boundaries), which places the coating in an under-dense state.

On the other hand, skilled artisans believe compressive internal stresses are generated by an atomic peening mechanism, where instant energetic particles strike the growing coating and drive surface atoms into the interior by recoil displacement reaction. Gas atoms, even as little as a few percent of argon are found in sputtered metallic thin films. Extensive studies on sputtering show that compressive intrinsic stresses vary with pressure of argon, deposition rate, deposition temperature, bias voltage, film source-to-substrate distance, angle of incidence, nature of inert gas, impurities in the gas, and subsequent annealing. A thin film microstructure depends mainly on argon pressure and substrate temperature.

Thin film thermal stresses result when the temperature of a thin film changes from its deposition temperature, introducing a strain because the film and substrate expand differently. Generally, as a temperature increases, the thermal stress of a thin film proportionally increases. In addition, temperature changes can induce thermal stresses due to formation of new crystal structures, recrystallization or work hardening.

Studies conducted on thin films show that intrinsic stress is largest on a film-substrate interface or film-film interface. Three types of stress, in-plane stress, normal stress and sheer stress contribute to an overall intrinsic stress exhibited in a film-substrate or film-film interface. Studies by skilled artisans have shown that the in-plane stress is quite uniform in films. Except very close to its edge, the thin films have a large sheer component normal stress existing near the film edge. If the significant normal stress existing near the edge of the film is not relieved by local plastic deformation, the film may detach during use. The large normal and shear stresses at the edge may cause adhesion failure and delamination. Thus, the durability and useful life of ink jet printheads employing protective layers, resistant to corrosion, cavitation and substantial temperature variation at high frequency, are limited by the residual stress inherent in all thin film layers.

Methods of measuring residual stress in thin films actually measure existing strain. Stress is determined indirectly by calculation or by calibration. Various methods differ with respect to the strain gauge used. Skilled artisans are familiar with various methods used, as discussed by Hoffman, Campbell and Well, R.W. Hoffman, "Physics of Thin Films", Vol. 3, page 211, Academic Press, New York (1966); D.S. Campbell, "Handbook of Thin Film Technology", Chapter 12, McGraw-Hill 1970); and R. weil, "Properties of Electrodeposits", The Electrochemical Society (1975), the disclosures of which are entirely incorporated herein by reference.

Figure 2:
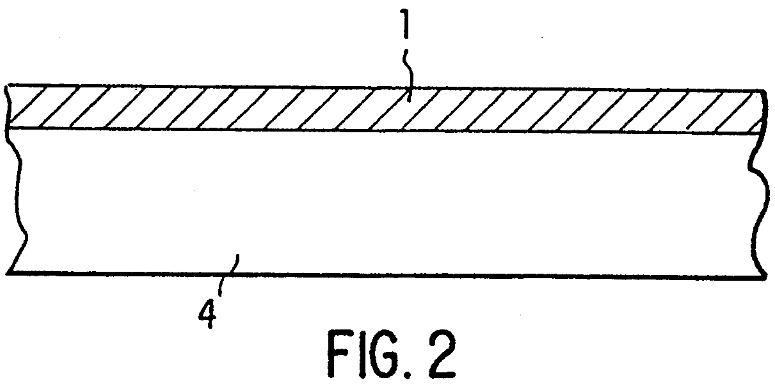
FIG. 2 is an illustrative inventive protective layer of the invention having reduced internal stress.
Figure 3:
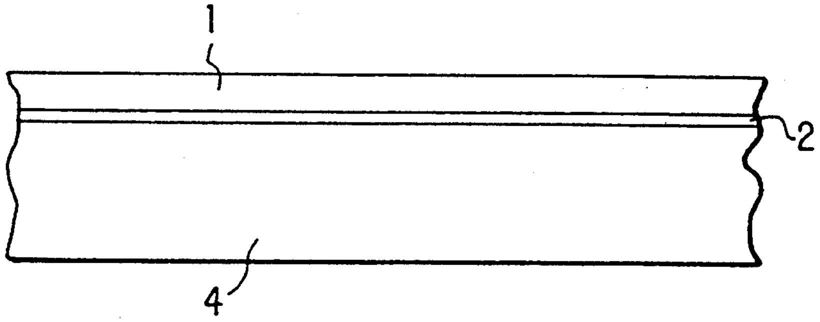
FIG. 3 is an inventive protective layer having reduced residual stress, incorporating the inventive adhesive region.
Figure 4:
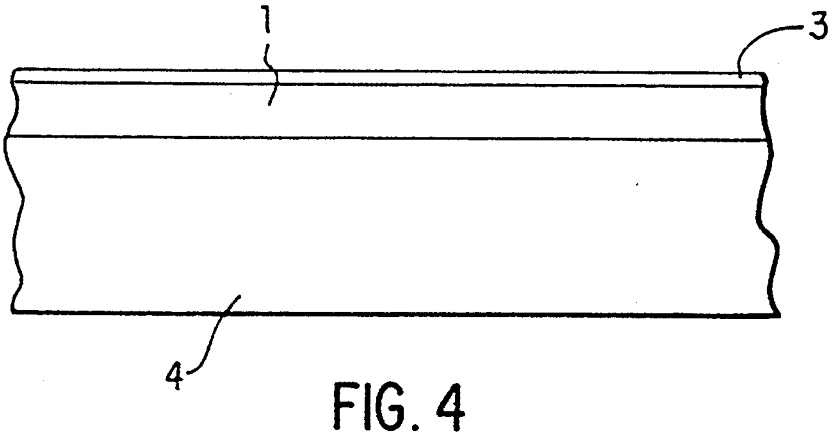
FIG. 4 is an illustrative inventive protective layer incorporating the inventive anodic region with reduced residual stress.

Applicants have discovered that a protective layer 1 (FIG. 2) made of a thin film material and having, at a device operating temperature, a thermal conductivity coefficient not less than about 10 W/m.K, a compressive yield strength not less than about 1400 MPa and a compressive residual stress of not greater than about 1200 MPa, results in superior protective layers, which significantly increase the life of a printhead. In the inventive protective layers, a smooth, substantially pore free layer is impervious to stress corrosion or hydrogen stress cracking at hydrogen uptake rates of less than 5 parts per million. The protective layers comprise a thin film material and possess the required characteristics at an operating temperature ranging from about 100° C. to 600° C. A substrate, 4, is shown in FIGS. 2-4.

The thin film material constituting the protective layer has the properties discussed above, particularly that it is impervious to stress failure, corrosion or hydrogen stress cracking.

Exemplary materials useful in the inventive thin film material include, but are not limited, to, metals selected from groups IVa, Va, VIa, VIIa and VIII of the periodic table of elements, some of the metals known as "valve metals." Stainless steel, super alloys or alloys of the valve metals are preferred. More preferred stainless steels include, but are not limited, to AISI SS310 TM, AISI SS329 TM or precipitation hardening stainless steels. Super alloys preferably include, but are not limited to an Inconel TM, Incoloy TM and Nimonic TM. More preferably, the super alloys are Inconel TM 600, Incoloy TM 800 or Nimonic TM 80. Preferred valve metals include, but are not limited to, aluminum, tantalum, niobium, tungsten, zirconium or hafnium. The above alloys have the following nominal compositions: AISI SS310, about 0.25% carbon, about 2% manganese, about 1.5% silicon, about 19-22% nickel, and about 24-26% chromium, by weight, the balance being iron; AISI 329, about 0.1% carbon, about 2% managnese, about 1% silicon, about 3-6% nickel, about 25-30% chromium, and about 1-2% molybdenum, by weight, the balance being iron; Inconel 600, about 15% chromium, 76% nickel, about 8% iron, and about 0.8% carbon, by weight; Incoloy 800, about 21% chromium, 32% nickel, about 0.4% titanium, about 0.4% aluminum, about 45% iron, and about 0.05% carbon, by weight; Nimonic 80, about 19.5% chromium, about 73% nickel, about 1% cobalt, about 2.25% titanium, about 1.4% Al, about 1.5% iron, and about 0.5% carbon, by weight.

Because of the inherent, higher intrinsic stress which exists at the grain boundaries of thin film material, a grain boundary of the thin film material may be stabilized and may preferably be stabilized and protected by a very thin layer of an oxide of the corresponding valve metal.

In a preferred embodiment of the invention, an adhesive region, 2, FIG. 3, existing between the thin film material and an underlying layer further reduces an internal stress between the thin film material and the underlying layer of substrate. The adhesive region should extend only into the grain boundaries of the thin film material and should comprise a reaction product between a reactive gas and the thin film material. To obtain the protective layer exhibiting improved durability, corrosion resistance and extending the useful life of the inventive printhead, as compared with conventional printheads, the adhesive region is formed concurrently with a deposited thin film material. Preferably the adhesive region concurrently forms at least during initial stages of growth of the thin film material. A concurrently formed adhesive region may be formed by introducing a reactive gas during the deposition process, permitting the reactive gas and depositing thin film material to react, thereby forming the adhesive region. Exemplary reactive gases include, but are not limited to oxygen, nitrogen and water vapor.

Materials useful in the adhesive region comprise compounds containing the reactive gas and the thin film material, the thin film material including the above-discussed materials. Preferably, a reaction product of the adhesive region includes, but is not limited to a nitride or oxide of a stainless steel, super alloy or valve metal. More preferably, the reaction product is a nitride or oxide of tantalum.

The inventive protective layer, preferably including an adhesive region of the reaction product, may preferably be deposited by reactive sputtering, reactive evaporation, reactive ion plating, chemical vapor deposition, plasma chemical vapor deposition or a corresponding modified technique thereof.

An other preferred embodiment of the invention includes a protective layer in which an underlying thin film material is covered by a contiguous anodic region 3, FIG. 4. The inventive anodic region is substantially pore-free, has a low internal (residual) stress and has an homogeneous composition. The resulting printhead having the anodic region is more resistive to cavitation and corrosive forces acting on the underlying thin film material. The anodic region specifically protects the thin film material against permeation of corrosive species and hydrogen. In order to obtain the inventive contiguous anodic region, the underlying thin film material is anodized in an aqueous electrolytic process, thereby resulting in compact, homogeneous protective layer being substantially pore free and permitting printheads which have remarkably extended useful lives in high frequency, high volume printing environments.

The inventive anodic region should be thin enough to prevent the anodic region acting as a substantial thermal barrier. Preferably, the thickness of the anodic region ranges from about 10 to 300 nanometers, more preferably from about 32 to about 150 nanometers.

In the aqueous electrolytic process, an electrolyte should not attack the growing anodic region, thereby producing a dense, smooth and substantially pore free outer layer.

The thickness of the anodic film depends on the anodization voltage, an intrinsic stress depending on the current density (namely the rate of growth in a constant current mode, or on the voltage and electrolytic strength in a constant voltage mode). Preferably, the pH of barrier electrolytes may preferably range from about 6 to about 8. Exemplary electrolytes include, but are not limited to, anionic and cationic electrolytes. Exemplary anionic electrolytes include, but are not limited to tartrates, borates, oxalates and phosphates. Cationic electrolytes may include alkali ions, preferably the ammonium ion. Materials useful in the inventive anodic region may include any of the above-discussed materials useful as thin film materials, preferably the anodic region comprises an anodized valve metal, more preferably, the valve metals are selected from the group consisting of aluminum, tantalum, zirconium, hafnium, niobium and tungsten.

In a process for preparing the inventive thermal ink jet printheads, a controlled deposition temperature, ambient deposition pressure and power level ensure a thermal ink jet printhead having the advantageous characteristics of the invention. In particular, a deposition temperature may preferably range from about 25° C. to about 500° C. and more preferably, from about 150° C. to about 300° C. Exemplary ambient deposition of pressures preferably range from about 1.5 mTorr to about 25 mTorr. A more preferred ambient deposition pressure ranges from about 3 mTorr to about 16 mTorr.

Exemplary power levels are necessarily sufficient to form the low internal stress protective layer, preferably at a bias voltage ranging from about −300 volts to about 300 volts, more preferably from about −200 volts to about 200 volts.

To form the inventive adhesive region, a reactive gas is introduced during the depositing step and an adhesive region is concurrently formed between the thin film material and an underlying layer. The process produces an adhesive region that extends only into the grain boundaries of the depositing thin film material and does not comprise a wholly distinct and separate layer. This process permits protection by a thin film material having a reduced internal stress level with greater adhesion properties.

In a preferred process, the reactive gas introduced during thin film depositing, includes, but is not limited to, oxygen, nitrogen and water vapor. Preferred deposition processes include, but are not limited to, reactive sputtering, reactive evaporation, reactive ion plating, vapor deposition, plasma vapor deposition or a modified technique thereof.

In a preferred process for forming a reduced stress anodic region contiguous with an underlying thin film material, a thin film material is exposed to an aqueous electrolyte. A constant voltage or constant current is applied to the aqueous electrolyte, thereby forming the inventive anodic region. The anodic region is, dense, substantially free of pores and has an homogeneous composition.

Preferred electrolytes which do not attack the forming anodic region include, but are not limited to tartrate, borate, oxalate, phosphate and alkali. A more preferred electrolyte is ammonium tartrate, preferably in a concentration ranging from about 1 weight percent to about 3 weight percent.

Exemplary applied constant voltages ranges include, but are not limited to, from about 25 volts to about 125 volts, preferably from about 80–100 volts, more preferably about 90 volts.

In a preferred process for forming the anodic region, a solution containing the electrolyte may include, but is not limited to, at least water, a glycol, an alcohol or a mixture of any of these liquids.

Although the following examples represent preferred embodiments of the invention, applicants do not intend that the examples limit the nature or scope of the invention to these preferred embodiments and provide ordinarily skilled artisans useful examples of representative embodiments.

EXAMPLE I

A thermal ink jet printhead having a reduced-stress tantalum protective layer is prepared in a Balzer's BAS-450 direct current sputtering system. On a thermal ink jet heater, having primarily a silicon wafer substrate, a silicon dioxide thermal barrier layer, a resistive layer overlaying the barrier layer and an electrically insulating layer covering the resistive layer, a reduced-stress layer is deposited over the electrically insulating layer.

To achieve a protective layer having optimally minimized internal stress, deposition conditions are carefully selected. The deposition chamber is evacuated to 15 mTorr and a substrate temperature is brought to 275° C. When the substrate temperature reaches the desired temperature, the heat source is terminated. Deposition is conducted at a 3 kWatt power setting, the temperature of the substrate remaining at about 275° C. throughout the deposition.

The substrate is rotated at 9.3 r.p.m. for about 5 minutes and tantalum deposited at about 1000Å/minute, until a reduced-stress tantalum layer, 5000Å, thick, is obtained.

The tantalum stress, measured as a change in the bowing of the silicon substrate before and after deposition, is measured at 18 pm of compressive stress at the midpoint over a distance of 6 cm. The tantalum stress measured confirms a remarkable two-fold stress reduction in the prepared tantalum layer, compared with devices prepared using known techniques.

In operational tests in a corrosive ink jet environment, the reduced-stress tantalum layer continues to function well in excess of $10^8$ cycles, showing no signs of printhead failure below this minimum performance threshold. In comparative tests using identical corrosive environments, known devices show repeated failure below the minimum performance threshold, 108 cycles.

EXAMPLE II

A thermal ink jet printhead is prepared according to the procedure in Example I. A 2% aqueous ammonium tartrate electrolytic solution is prepared. The printhead, having a deposited tantalum protective layer, is immersed in the ammonium tartrate solution and a 90 V potential is applied to anodize the tantalum surface until a tantalum oxide ($Ta_2O_5$) layer, 1700Å thick, is obtained.

During formation, 500Å of tantalum deposited in the protective layer is consumed.

In an open pool environment, the anodized tantalum oxide surface is subjected to severe cavitation forces. The anodized device exhibited at least a five-fold improvement in device lifetime as compared with identical tests conducted on devices having no anodized protective surface.

What is claimed is:

1. A thermal ink jet printhead comprising a protective layer on a thermal ink jet heater, the protective layer comprising a thin film material, the material having:

a) a melting point not less than about 1000° C.; and b) at an operating temperature for the thermal ink let printer, a thermal conductivity coefficient not less than about 10 W/m.K, a compressive yield strength not less than about 1400 MPa, and a compressive residual stress of not greater than about 1200 MPa, wherein the protective layer is smooth, impervious to stress failure, corrosion or hydrogen stress cracking at a hydrogen absorption rate of about less than about 5 ppm, and a non-resistor, wherein the thin film material is an alloy having a nominal composition of about 0.25 wt. % carbon, about 2 wt. % manganese, about 2.5 wt. % silicon, from about 19 to about 22 wt. % nickel and from about 24 to about 26 wt. % chromium, a balance of the material being iron.

2. The printhead according to claim 1, wherein the operating temperature ranges from about 100° C. to about 600° C.

3. The printhead according to claim 1, wherein the protective layer is free of pores.

4. A thermal ink let printhead comprising a protective layer on a thermal ink jet heater., the protective layer comprising a thin film material, the material having:

a) a melting point not less than about 1000° C.; and b) at an operating temperature for the thermal ink jet printer, a thermal conductivity coefficient not less than about 10 W/m.K, a compressive yield strength not less than about 1400 MPa, and a compressive residual stress of not greater than about 1200 MPa, wherein the protective layer is smooth, impervious to stress failure, corrosion or hydrogen stress cracking at a hydrogen absorption rate of about less than about 5 ppm, and a non-resistor, wherein the thin film material is an alloy having a nominal composition of about 0.1 wt. % carbon, about 2.0 wt. % manganese, about 1.0 wt. % silicon, from about 3 to about 6% nickel, from about 25 to about 30 wt. % chromium and from about 1 to about 2 wt. % molybdenum, a balance of the material being iron.

5. A thermal ink jet printhead comprising a protective layer on a thermal ink jet heater, the protective layer comprising a thin film material, the material having:

a) a melting point not less than about 1000° C.; and b) at an operating temperature for the thermal ink jet printer, a thermal conductivity coefficient not less than about 10 W/m.K, a compressive yield strength not less than about 1400 MPa, and a compressive residual stress of not greater than about 1200 MPa, wherein the protective layer is smooth, impervious to stress failure, corrosion or hydrogen stress cracking at a hydrogen absorption rate of about less than about 5 ppm, and a non-resistor, wherein the thin film material is an alloy having a nominal composition of about 15 wt. % chromium, about 76 wt. % nickel, about 8 wt. % iron and about 0.089 wt. % carbon.

6. A thermal ink jet printhead comprising a protective layer on a thermal ink jet heater, the protective layer comprising a thin film material, the material having:

a) a melting point not less than about 1000° C.; and b) at an operating temperature for the thermal ink jet printer, a thermal conductivity coefficient not less than about 10 W/m.K, a compressive yield strength not less than about 1400 MPa, and a compressive residual stress of not greater than about 1200 MPa, wherein the protective layer is smooth, impervious to stress failure, corrosion or hydrogen stress cracking at a hydrogen absorption rate of about less than about 5 ppm, and a non-resistor, wherein the thin film material is an alloy having a nominal composition of about 21 wt. % chromium, about 32 wt. % nickel, about 0.4 wt. % titanium, about 0.4 wt. % aluminum, about 45 wt. % iron and about 0.05% carbon.

7. A thermal ink jet printhead comprising a protective layer on a thermal ink jet heater, the protective layer comprising a thin film material, the material having:

a) a melting point not less than about 1000° C.; and b) at an operating temperature for the thermal ink jet printer, a thermal conductivity coefficient not less than about 10 W/m.K, a compressive yield strength not less than about 1400 MPa, and a compressive residual stress of not greater than about 1200 MPa, wherein the protective layer is smooth, impervious to stress failure, corrosion or hydrogen stress cracking at a hydrogen absorption rate of about less than about 5 ppm, and a non-resistor, wherein the thin film material is an alloy having a nominal composition of about 19.5 wt. % chromium, about 73 wt. % nickel, about 1.0 wt. % cobalt, about 2.25 wt. % titanium, about 1.4 wt. % aluminum, about 1.5 wt. % iron and about 0.05% wt. % carbon.

* * * * *